US008043424B2

(12) United States Patent
Thiel et al.

(10) Patent No.: US 8,043,424 B2
(45) Date of Patent: Oct. 25, 2011

(54) AQUEOUS COATING COMPOSITION

(75) Inventors: Detlef Thiel, Köln (DE); Irene Buss, Pulheim (DE)

(73) Assignee: Akzo Nobel Coatings International B.V., Arnhem (NL)

( * ) Notice: Subject to any disclaimer, the term of this patent is extended or adjusted under 35 U.S.C. 154(b) by 377 days.

(21) Appl. No.: 11/916,251

(22) PCT Filed: May 30, 2006

(86) PCT No.: PCT/EP2006/062733
§ 371 (c)(1),
(2), (4) Date: Feb. 20, 2008

(87) PCT Pub. No.: WO2006/128875
PCT Pub. Date: Dec. 7, 2006

(65) Prior Publication Data
US 2008/0221268 A1 Sep. 11, 2008

(30) Foreign Application Priority Data

Jun. 1, 2005 (EP) ..................................... 05104758

(51) Int. Cl.
*C09D 4/00* (2006.01)
*C09D 151/08* (2006.01)
*C09D 167/08* (2006.01)
*C09D 283/02* (2006.01)

(52) U.S. Cl. ................... 106/287.24; 525/165; 525/170; 525/228; 106/238

(58) Field of Classification Search ................... 525/165, 525/191, 222, 227, 228, 167.5, 170, 185, 525/190; 106/238, 287.24, 287.25, 287.26
See application file for complete search history.

(56) References Cited

U.S. PATENT DOCUMENTS

| 4,451,596 | A | | 5/1984 | Wilk et al. |
| 5,877,241 | A | * | 3/1999 | Giles et al. ..................... 524/104 |
| 6,013,733 | A | * | 1/2000 | Singer et al. .................. 525/208 |
| 6,063,501 | A | * | 5/2000 | Larrow et al. ................. 428/461 |
| 6,140,386 | A | * | 10/2000 | Vanderhoff et al. ............ 522/78 |
| 6,270,905 | B1 | | 8/2001 | Swarup et al. |
| 6,313,224 | B1 | * | 11/2001 | Singer et al. .................. 525/208 |

FOREIGN PATENT DOCUMENTS

| EP | 0 332 326 | | 9/1989 |
| EP | 0 444 454 B1 | | 9/1991 |
| EP | 0 444 454 B2 | | 9/1991 |
| EP | 0225611 B1 | * | 3/1992 |
| EP | 612821 A1 | * | 8/1994 |
| EP | 0 874 875 | | 11/1998 |
| EP | 1 171 534 | | 1/2002 |

OTHER PUBLICATIONS

PCT International Search Report, International Application No. PCT/EP2006/062733, dated Sep. 13, 2006.
PCT International Preliminary Report on Patentability and Written Opinion, International Application No. PCT/EP2006/062733, dated Oct. 26, 2007.

* cited by examiner

Primary Examiner — Irina S Zemel
Assistant Examiner — Jeffrey Lenihan
(74) Attorney, Agent, or Firm — Kenyon & Kenyon LLP

(57) ABSTRACT

Aqueous coating composition comprising an oxidatively drying resin and an alkali-soluble acrylate having an acid number of at least 15 mg KOH/g in a content of at least 1.5 wt. %. Optionally a second acrylate can also be used, such as a polyurethane acrylate.

22 Claims, No Drawings

AQUEOUS COATING COMPOSITION

The present invention relates to an aqueous coating composition based on an oxidatively drying polymer.

In recent years, considerable effort has been expended to develop coating compositions with a low content of volatile organic compounds (VOC), particularly solvents. Regulations to limit the VOC content of coatings have encouraged research and development to explore new technologies directed at reducing solvent emissions from coatings. One technology involves the replacement of organic solvents with water. However, although the use of water-borne coating compositions brings health and safety benefits, these coating compositions still must meet the performance standards expected for solvent-based compositions.

Oxidatively drying polymers are polymers which crosslink on exposure to oxygen from air by virtue of containing unsaturated fatty acid residues. Alkyds are typical examples of such polymers. Alkyd paints cure under the influence of oxygen, via oxidative crosslinking of unsaturated fatty acid building blocks. However, alkyd paints generally show relatively slow drying times. To reduce the drying times, hybrids of water borne alkyds and relatively high-molecular weight acrylic polymers have been proposed. Acrylated alkyds, such as those disclosed in U.S. Pat. No. 4,451,596, have also been proposed.

EP 0 874 875 discloses a high solids water borne paint composition based on an alkyd and an acrylate. EP 1 171 534 discloses a water borne coating composition based on a mixture of an oxidatively drying polymer, such as an alkyd, and a carbonyl-functional vinyl polymer.

Whereas in prior art alkyd—acrylic hybrid paint systems use is made of emulsified acrylates with a relatively high molecular weight, it was now surprisingly found that if alkali-soluble acrylates with an acid number of at least 15 mg/KOH are used, this results in unexpected advantages, such as improved open time, flow and substrate wetting. Further, it allows the formulation of high-solid aqueous paints with a content of water and VOC below 40% by weight of the total composition. It was also found that, in most cases, gloss potential and hiding power was substantially improved. The alkali-soluble acrylates are non-crosslinking, meaning that they do not form covalent links with the oxidatively drying resin or to other possibly present binders to a substantial extent. The acrylates are used in an amount of 1.5% or more by total weight of the coating composition, e.g. 4.5 wt % or more.

In current practice, such acrylates are often used as grinding aids. Generally, these acrylates are water-swellable and have a relatively high acid number, e.g., 65 mg KOH/g acrylate or higher, or 70 mg KOH/g acrylate or higher.

In general, such alkali-soluble acrylates have an average molecular weight Mw of 200.000 g/mole or lower. In this respect, Mw means the weight average molecular weight. The Mw can for example be determined by gel permeation chromatography (GPC) which is described on page 4, Chapter I of The Characterization of Polymers published by Rohm and Haas Company, Philadelphia, Pa. in 1976, utilizing polymethyl methacrylate as the standard. The weight average molecular weight Mw can also be calculated. In systems containing chain transfer agents, the theory weight average molecular weight is the total weight of polymerizable monomer in grams divided by the total molar amount of chain transfer agent used during the polymerization. For an emulsion polymer system that does not contain a chain transfer agent, a cruder estimate can be obtained by taking the total weight of polymerizable monomer in grams and dividing that quantity by the product of the molar amount of an initiator multiplied by an efficiency factor. Further information on theoretical molecular weight calculations can be found in Principles of Polymerization 2nd edition, by George Odian published by John Wiley and Sons, N.Y., N.Y. in 1981 and in Emulsion Polymerization edited by Irja Pirma published by Academic Press, N.Y., N.Y. in 1982.

The acrylate can be obtained by the free radical addition polymerisation of at least one olefinically unsaturated monomer selected from esters of acrylic acid and methacrylic acid, examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, and n-propyl methacrylate. Other suitable monomers are for example 1,3-butadiene, isoprene, styrene, divinyl benzene, acrylonitrile, methacrylonitrile, vinyl halides (such as vinyl chloride), vinyl esters (such as vinyl acetate, vinyl propionate, and vinyl laurate), heterocyclic vinyl compounds, alkyl esters of mono-olefinically unsaturated dicarboxylic acids (such as di-n-butyl maleate and di-n-butyl fumarate). In addition, the acrylate may contain, as copolymerised units, small amounts (mostly from 0.5 to 10% by weight) of mono-olefinically unsaturated monocarboxylic acids and/or dicarboxylic acids, mostly of 3 to 6 carbon atoms, and/or of their N-unsubstituted or N-substituted amides, especially acrylic acid, methacrylic acid, beta-carboxyethyl acrylate, fumaric acid, itaconic acid, acrylamide, methacrylamide, N-methyl acrylamide, N-methylol acrylamide, N-n-butoxymethyl methacrylamide, maleimide, and maleic acid diamide, as well as mono-olefinically unsaturated sulphonic acids, especially vinyl sulphonic acid and meth-acrylamidopropane sulphonic acid. Good results have been obtained using a pure acrylate, purely built of acrylic and/or methacrylic esters and/or acids. A commercially available example of a suitable alkali-soluble acrylate is for instance Joncryl 8004, available from Johnson Polymer.

At least part of the oxidatively drying resin comprises oxidatively drying groups, i.e. unsaturated aliphatic compounds, at least a portion of which is polyunsaturated. Typical examples of such resins are alkyds. Alkyd resins can be prepared from unsaturated and saturated fatty acids, polycarboxylic acids, and di- or polyvalent hydroxyl compounds. Mono- and polyunsaturated fatty acids can for instance be used, e.g., those containing 12 to 26 carbon atoms. Specific examples are mono-unsaturated fatty acids, such as lauroleic acid, myristoleic acid, palmitoleic acid, oleic acid, gadoleic acid, erucic acid, ricinolinic acid; bi-unsaturated fatty acids, such as linoleic acid; tri-unsaturated acids, such as linolenic acid, eleostearic acid, and licanic acid; quadri-unsaturated fatty acids, such as arachidonic acid and clupanodonic acid, and other unsaturated fatty acids obtained from animal or vegetable oils. Optionally, saturated fatty acids can also be used. Specific examples include lauric acid, myristic acid, palmitic acid, stearic acid, and arachidic acid. Other monocarboxylic acids suitable for use include tetrahydrobenzoic acid and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed, optionally in the presence of one or more saturated, (cyclo)aliphatic or aromatic monocarboxylic acids, e.g., pivalic acid, 2-ethylhexanoic acid, lauric acid, palmitic acid, stearic acid, 4-tert.butyl-benzoic acid, cyclopentane carboxylic acid, naphthenic acid, cyclohexane carboxylic acid, 2,4-dimethyl benzoic acid, 2-methyl benzoic acid, and benzoic acid.

Examples of polycarboxylic acids include phthalic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerised fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetracarboxylic acid, endoisopropylidene-cyclohexane-1,2-dicarboxylic acid, cyclohexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1-4 carbon atoms.

In addition, the alkyd resin comprises di- or polyvalent hydroxyl compounds. Examples of suitable divalent hydroxyl compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol.

The alkyd resins can be obtained by direct esterification of the constituent components, with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil. Transesterification with the other added acids and diols will then give the final alkyd resin. This transesterification generally takes place at a temperature in the range of 115 to 250° C., optionally with solvents such as toluene and/or xylene also present. The reaction generally is carried out in the presence of a catalytic amount of a transesterification catalyst. Examples of transesterification catalysts suitable for use include acids such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

The number average molecular weight Mn of the alkyd resin thus prepared can for example be at least 1000, e.g., from 2000 to 5000. The alkyd can be dispersed in water, e.g., with 2-30 wt. % surfactant.

Optionally, the oxidatively drying resin can be a urethane alkyd. Such alkyds can for instance be prepared as disclosed in EP-A 0 444 454. Suitable polyurethanes comprising oxidatively drying fatty ester groups are for instance NeoRez R 2001, NeoRez R 2020, NeoRez R2040 (avalaible from DSM Neoresins), Valires HA 04001 (ex Actichem), Spensol F97 (ex Reichold) and Halwedrol OX 47-1-340, ex Hüttenes-Albertus.

For the purposes of this invention an aqueous coating composition means a composition in an aqueous medium of which water is the principal component. Minor amounts of organic liquids, i.e. co-solvents, may optionally be present. Examples of co-solvents include propylene carbonate, N-methyl pyrrolidone (NMP), ethylene diglycol, butyl glycol, butyl diglycol, n-butoxy propanol, and dipropylene glycol monomethyl ether, propylene glycol, and methoxy butanol.

Siccatives or driers can be used to promote oxidative curing of the alkyd resin. Examples of siccatives are metal salts of aliphatic acids including cycloaliphatic acids, such as octanoic acid and naphthenic acid, where the metal is, for example, cobalt, manganese, vanadium, lead, zirconium, calcium, zinc, or rare earth metals. Also mixtures of siccatives are used. The siccatives (calculated as metal) are usually applied in an amount of 0.001 to 5 wt. %, calculated on the alkyd resin solids content. Optionally, the coating composition can comprise drying-accelerating, complexing agents, for example 2,2'-bipyridyl and 1,10-phenantroline. The complexing agents can for instance be added in an amount up to 3 wt-%, e.g., 0.1-1.5 wt-%, based on the weight of the total binder.

Optionally, the coating composition comprises a further acrylate binder, e.g. an emulsified latex binder. It was found that in most cases the alkali soluble acrylate had a positive influence on the compatability of the oxidatively drying resin and emulsified acrylate binders. The emulsified acrylate binders can for instance have a weight average molecular weight Mw of 300,000 g/mole or higher. A suitable example of such an acrylate binder is Primal® AC 2508, available from Rohm and Haas. A suitable pure acrylate is Joncryl® SCX 8285, available from Johnson Polymer. Such an acrylate can be crosslinkable, for example by azomethin crosslinking. Such an acrylate can be provided with a self-crosslinking functionality. Suitable examples are carbonyl functional acrylates, such as Joncryl® SCX 8383 and Neocryl® XK 98, crosslinkable by hydrazines or polyamines, such as the ones disclosed in EP 1 171 534. A suitable polycarbonyl acrylate can be formed by the free-radical addition polymerisation of at least one carbonyl-containing monoethylenically unsaturated monomer with at least one other olefinically unsaturated monomer not providing carbonyl functionality. Examples of unsaturated monomers which bear carbonyl functional groups include acrolein, methacrolein, diacetone-acrylamide, crotonaldehyde, 4-vinylbenzaldehyde, vinyl alkyl ketones of 4 to 7 carbon atoms such as vinyl methyl ketone, and acryloxy- and methacryloxy-alkyl propanols. Further examples include acrylamidopivalaldehyde, methacrylamidopival aldehyde, 3-acrylamidomethylanisaldehyde, diacetone acrylate, and diacetone methacrylate. The proportion of carbonyl functional groups in the vinyl polymer can for example be 3 to 200 milliequivalents per 100 g polymer, for instance 6 to 100 milliequivalents per 100 g polymer. Examples of non-carbonyl-providing olefinically unsaturated monomers include 1,3-butadiene, isoprene, styrene, divinyl benzene, acrylonitrile, methacrylonitrile, vinyl halides (such as vinyl chloride), vinyl esters (such as vinyl acetate, vinyl propionate and vinyl laurate), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid, examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, hydroxyethyl methacrylate, hydroxypropyl methacrylate, isopropyl methacrylate, n-propyl acrylate, and n-propyl methacrylate. Olefinically unsaturated monomers bearing anionic water-dispersing groups may also be used, examples of which include acrylic acid, methacrylic acid, itaconic acid and/or maleic acid. Olefinically unsaturated monomers having non-ionic groups, such as alkoxy polyethylene glycol methacrylates, may also be used.

Optionally, the carbonyl functional acrylate may bear amine and/or hydrazine functional groups in addition to the carbonyl functional groups. Hydrazine functional groups may be introduced by polymerising at least one olefinically unsaturated monomer with chain-pendant hydrazinolysable groups which are subsequently reacted with a hydrazine yielding agent to convert at least a proportion of the hydrazinolysable groups into hydrazine functional groups. Examples of monomers providing chain-pendant hydrazinolysable groups include chloracrylic acid and especially acid chlorides or esters of acrylic acid, and also acid chlorides or esters of methacrylic acid. Suitable methacrylic acid esters are methyl, ethyl, propyl, isopropyl, n-butyl, tertiary or secondary butyl esters.

A suitable carbonyl-functional acrylate may be prepared by any suitable free-radical initiated polymerisation technique, a free-radical initiator and appropriate heating (e.g. 40° C. to 90° C.) being employed. The polymerisation can be effected in an aqueous medium, and in particular aqueous emulsion polymerisation is used to prepare the polymer with optionally conventional dispersants being used. Free radical initiators include hydrogen peroxide, t-butyl hydroperoxide, and persulphates such as $NH_4$ persulphate, K-persulphate and Na-persulphate or a redox system may be used.

Separate polyamines or polyhydrazines can be used to crosslink the polycarbonyl binder. If discrete polyamines or polyhydrazines crosslinkers are added, the content can for example be such that the composition comprises about 0.02 to 1.6 moles, e.g., 0.05 to 0.9 moles of amine or hydrazine groups per mole of carbonyl functional groups present in the composition. Possible polyamines include but are not limited to those with primary and/or secondary amino groups having from 2 to 10 such amino groups per molecule. Good results have been obtained using primary amines. Suitable examples include ethylene diamine, 4-amino-1,8-octanediaminopropylene diamine, decamethylene diamine, 1,2-diaminocyclohexane, isophorone diamine, urea, N-(2-hydroxyethyl)ethylene diamine, tris(2-aminoethyl)amine, melamine, diethylene triamine, dipropylene triamine, dibutylene triamine, and polyethylene imines. Possible polyhydrazines include dicarboxylic acid bis-hydrazides, bis-hydrazones, specific examples being oxalic acid dihydrazide, malonic acid dihydrazide, succinic acid dihydrazide, adipic acid dihydrazide, and sebacic acid dihydrazide, cyclohexane dicarboxylic acid bis-hydrazides, azelaic acid bis-hydrazides; also carbonic acid hydrazides, bis-semicarbazides, trihydrazides, dihydrazinoalkones and dihydrazines of aromatic hydrocarbons, for example 1,4-dihydrazinobenzene and 2,3-dihydrazinonophthalene, dihydrazine.

Optionally, the carbonyl functional acrylate can be a polyurethane acrylate, e.g., of the type described in EP-A 0 332 326. The polyurethane acrylate may be formed by subjecting one or more vinyl monomers to free radical polymerisation conditions in the presence of a dispersion of an already chain-extended polyurethane resin using conventional techniques. Thus, free radical initiators may be added to a mixture of polyurethane dispersion and vinyl monomer or, alternatively, monomer may be added gradually to a polyurethane dispersion containing initiator. In another variant of the preparation of polyurethane/acrylate a solution is formed of an isocyanate-terminated prepolymer in at least one vinyl monomer. The solution is then emulsified in an aqueous medium and the isocyanate-terminated prepolymer is chain extended. Subsequently, either vinyl monomer can be added and the polymerisation thereof initiated or the polymerisation of the vinyl monomer can be initiated and further vinyl monomer can be added during polymerisation. Suitable examples of such a polyurethane acrylate are Neopac® E111, Neopac® E 125, commercially available from DSM NeoResins, and Alberdingk® APU 1061 and Alberdingk® APU 1062 from Alberdingk Boley.

In the coating composition according to the invention, the weight ratio of alkali solube acrylate to emulsified acrylate can for example be in the range of 1:0.5 to 1:5. The weight ratio of alkali solube acrylate to oxidatively drying binder can for example be in the range of 1:0.5 to 1:10.

The coating composition may furthermore contain one or more additives or adjuvants, such as pigments, dyes, fillers, anti-oxidants, anti-ozonants, matting agents, pigment dispersants, UV stabilisers, co-solvents, dispersants, surfactants, inhibitors, fillers, anti-static agents, flame-retardant agents, lubricants, anti-foaming agents, extenders, plasticisers, anti-freezing agents, thixotropic agents, wetting agents, sterically hindered amines, bactericides, fungicides, anti-skinning agents, perfumes, anti-foaming agents, drying stabilisers, and waxes. If so desired, a thickening agent is used in the coating composition of the present invention, such as an associative thickener, e.g., associative polyurethane thickeners. Examples include Polyphobe 9823, ex Union Carbide, Acrysol RM 2020 and Acrysol RM8, ex Rohm & Haas, Bermodol PUR2130, ex Akzo Nobel, Rheo 2000 and Coapur 5035, ex Coatex, Tafigel PUR 40 and Tafigel PUR 45, ex Munzing, Serad FX 1035 and FX 1070, ex Servo, and Optiflo L100 and L120, ex Ashland Süd-chemie. For example, up to 10 wt. % (solid on solid resin) of thickening agent can be used in the coating composition, e.g., 1 to 10 wt. %, such as 2 to 5 wt. %.

Suitable pigments are, e.g., natural or synthetic pigments which may be transparent or not. Examples of suitable pigments are titanium dioxide, red iron oxide, orange iron oxide, yellow iron oxide, phthalocyanine blue, phthalocyanine green, molybdate red, chromium titanate, and earth colours such as ochres, green earths, umbers, and burnt or raw Siennas.

The coating compositions can be applied to a substrate in any suitable manner, e.g., by means of roller coating, spraying, brushing, sprinkling, flow coating or dipping. The composition can for example be applied by brushing, spraying or roller coating.

Suitable substrates include metals or synthetic materials, wood, concrete, cement, brick, paper or leather, all of which may optionally have been pre-treated or pre-painted. The applied coat can be cured very suitably at a temperature of, e.g., 0-40° C. Optionally, a curing temperature above 40° C. may be employed, as a result of which the curing time can be reduced. The coating composition can be used as a translucent or opaque primer or paint in decorative applications. The coating composition according to the invention is for example particularly useful as a trim paint.

The invention is further illustrated by the following examples. In the examples, the following test methods were used. Hiding power was tested according to DIN 55987 and DIN ISO 6504-3. Flow properties were visually judged on rolled and brushed applications on ½ qm opacity charts (EN 4628/1). Open time was visually judged of (finger-) rubs on 150 µm draw downs on opacity charts in two min. intervals, judging flow of rubs (EN 4628/2).

EXAMPLE 1

A paint was prepared by mixing the following components:
4 pbw water
0.3 pbw ammonia
7 pbw glycol co-solvents
1 pbw Disperbyk®190

3 pbw of a thickener (Acrysol® RM-2020)
0.3 pbw of a defoamer
1 pbw of a rheology modifier
24 pbw of titanium dioxide
4 pbw of a calcium carbonate filler
21 pbw of an acrylic resin emulsion
8.5 pbw of an acrylic grinding resin.
25 pbw of a medium-oil length alkyd emulsion
0.5 pbw of a wetting agent
0.7 pbw of a siccative
0.2 pbw of a deaerator The open time was as good as with standard acrylic trim paints or standard acrylic/alkyd hybrid water borne trim paints despite a significantly higher solid content (61 wt. % solids).

The flow at brush and roller application was comparable to that of solvent-borne systems, which usually have excellent flow. Even on large and flat surfaces such as doors the flow results were very good.

Wetting of, e.g., OEM-coated subjects as doors, radiators and furniture and on solvent-borne alkyd based coats is very good. Unlike with common water borne alkyd or acrylic/alkyd hybrid based trim paints, which often show de-wetting effects such as cissing, cratering or paint contraction at application by brush and roller and spray application, these defects were not observed when using the paint of this example.

EXAMPLE 2

A paint is prepared by mixing the following components:
5 pbw water
0.5 pbw ammonia
7 pbw co-solvents
1 pbw Disperbyk®190
4 pbw of an associative thickener
0.3 pbw of a defoamer
1 pbw of a rheology modifier
21 pbw of titanium dioxide
5 pbw of a calcium carbonate filler
21 pbw of a polyurethane acrylate (NeoPac® E125)
9 pbw of an acrylic grinding resin
28 pbw of a medium-oil length alkyd emulsion
0.5 pbw of a wetting agent
0.7 pbw of a siccative

EXAMPLE 3

A paint is prepared by mixing the following components:
0.1 pbw ammonia
6.5 pbw co-solvents
0.4 pbw surfactant
3.8 pbw of an associative thickener
0.5 pbw of a defoamer
16 pbw of fillers
20 pbw of titanium dioxide
21 pbw of an emulsified acrylate (Neocryl® XK-98)
9 pbw of an acrylic grinding resin (Joncryl® 8004)
22.5 pbw of a medium-oil length alkyd emulsion (Resydrol® AF 6111)
0.5 pbw of a wetting agent
0.65 pbw of a siccative The paint showed excellent hiding power, which was about 25% better than the standard acrylic trim paints and excellent filling. Flow properties and open-time were very good.

The invention claimed is:

1. An aqueous coating composition comprising:
   an oxidatively drying alkyd or urethane alkyd resin; and
   an acrylate, wherein the acrylate is a non-cross-linking alkali-soluble acrylate having a weight average molecular weight Mw below 200,000 g/mole and an acid number of at least 65 mg KOH/g, in a content of at least 3% by weight of the composition.

2. Coating composition according to claim 1 wherein the composition further comprises an emulsified second acrylate.

3. Coating composition according to claim 2 wherein the second acrylate has an Mw of at least 300,000 g/mole.

4. Coating composition according to claim 3 wherein the second acrylate is crosslinkable.

5. Coating composition according to claim 4 wherein the second acrylate comprises carbonyl groups.

6. Coating composition according to claim 2 wherein the weight ratio of alkali-soluble acrylate to the second emulsified acrylate is in the range of 1:0.5 to 1:5.

7. Coating composition according to claim 2 wherein the weight ratio of alkali-soluble acrylate to oxidatively drying resin is in the range of 1:0.5 to 1:10.

8. Coating composition according to claim 1 wherein the content of alkali-soluble acrylate is at least 4.5 wt. %.

9. Coating composition according to claim 1 wherein the acid number of the alkali-soluble acrylate is at least 70 mg KOH/g.

10. Coating composition according to claim 8 wherein the acid number of the alkali-soluble acrylate is at least 70 mg KOH/g.

11. Coating composition according to claim 10 wherein the composition further comprises an emulsified second acrylate.

12. Coating composition according to claim 11 wherein the second acrylate has an Mw of at least 300,000 g/mole.

13. Coating composition according to claim 12 wherein the second acrylate comprises carbonyl groups.

14. Coating composition according to claim 11 wherein the weight ratio of alkali-soluble acrylate to the second emulsified acrylate is in the range of 1:0.5 to 1:5.

15. Coating composition according to claim 11 wherein the weight ratio of alkali-soluble acrylate to oxidatively drying resin is in the range of 1:0.5 to 1:10.

16. Coating composition according to claim 11 wherein the second acrylate is crosslinkable by azomethin crosslinking.

17. Coating composition according to claim 1 further comprising a pigment selected from the group consisting of titanium dioxide, red iron oxide, orange iron oxide, yellow iron oxide, phthalocyanine blue, phthalocyanine green, molybdate red, chromium titanate, and earth colors.

18. Coating composition according to claim 17 wherein the earth colors are selected from the group consisting of ochres, green earths, umbers, burnt Siennas and raw Siennas.

19. Coating composition according to claim 1 wherein the oxidatively drying alkyd resin has a number average molecular weight Mn of from 2000 to 5000.

20. Coating composition according to claim 1, wherein the alkali-soluble acrylate is a pure acrylate, built of an ester or acid selected from an acrylic ester, a methacrylic ester, an acrylic acid, a methacrylic acid, and combinations thereof.

21. Coating composition according to claim 6 wherein the weight ratio of alkali soluble acrylate to oxidatively drying binder is in the range of 1:0.5 to 1:10.

22. Coating composition according to claim 14 wherein the weight ratio of alkali soluble acrylate to oxidatively drying binder is in the range of 1:0.5 to 1:10.

* * * * *